US012686769B2

(12) United States Patent
Karayianni

(10) Patent No.: US 12,686,769 B2
(45) Date of Patent: Jul. 21, 2026

(54) POLYETHERESTER

(71) Applicant: Celanese Polymers Holding, Inc., Wilmington, DE (US)

(72) Inventor: Eleni Karayianni, Geneva (CH)

(73) Assignee: Celanese Polymers Holding, Inc., Wilmington, DE (US)

( * ) Notice: Subject to any disclaimer, the term of this patent is extended or adjusted under 35 U.S.C. 154(b) by 821 days.

(21) Appl. No.: 17/996,547

(22) PCT Filed: Jun. 15, 2021

(86) PCT No.: PCT/US2021/037381
§ 371 (c)(1),
(2) Date: Oct. 19, 2022

(87) PCT Pub. No.: WO2021/257535
PCT Pub. Date: Dec. 23, 2021

(65) Prior Publication Data

US 2023/0220194 A1 Jul. 13, 2023

Related U.S. Application Data

(60) Provisional application No. 63/039,171, filed on Jun. 15, 2020, provisional application No. 63/039,098, filed on Jun. 15, 2020, provisional application No. 63/039,133, filed on Jun. 15, 2020.

(51) Int. Cl.

| | |
|---|---|
| ***C08L 67/02*** | (2006.01) |
| ***C08G 63/183*** | (2006.01) |
| ***C08G 63/672*** | (2006.01) |
| ***C08G 65/20*** | (2006.01) |
| ***C08K 3/016*** | (2018.01) |
| ***C08K 3/32*** | (2006.01) |
| ***C08K 5/00*** | (2006.01) |
| ***C08K 5/3492*** | (2006.01) |
| ***C08K 5/521*** | (2006.01) |
| ***C08K 5/5313*** | (2006.01) |
| ***C09K 21/12*** | (2006.01) |
| ***H01B 3/42*** | (2006.01) |

(52) U.S. Cl.
CPC .......... *C08L 67/025* (2013.01); *C08G 63/183* (2013.01); *C08G 63/672* (2013.01); *C08G 65/20* (2013.01); *C08K 3/32* (2013.01); *C08K 5/34922* (2013.01); *C08K 5/34928* (2013.01); *C08K 5/521* (2013.01); *C08K 5/5313* (2013.01); *C09K 21/12* (2013.01); *H01B 3/421* (2013.01); *H01B 3/422* (2013.01); *C08K 3/016* (2018.01); *C08K 2003/327* (2013.01); *C08K 2003/328* (2013.01); *C08K 2003/329* (2013.01); *C08K 5/0066* (2013.01); *C08K 2201/003* (2013.01); *C08K 2201/014* (2013.01); *C08L 2201/02* (2013.01); *C08L 2203/202* (2013.01)

(58) Field of Classification Search
CPC ............... C08L 67/025; C08L 2201/02; C08L 2203/202; C08G 63/183; C08G 65/20; C08G 63/672; C08K 3/32; C08K 5/34922; C08K 5/521; C08K 5/5313; C08K 2003/327; C08K 2003/328; C08K 2003/329; C08K 2201/003; C08K 2201/014; C08K 5/34928; C08K 3/016; C08K 5/0066; C09K 21/12; H01B 3/421
See application file for complete search history.

(56) References Cited

U.S. PATENT DOCUMENTS

2006/0020064 A1 1/2006 Bauer et al.
2009/0176091 A1 7/2009 Karayianni et al.
2010/0025643 A1 * 2/2010 Hoerold ............... C08K 5/5313 524/133
2012/0211256 A1 8/2012 Karayianni et al.
2013/0146330 A1 * 6/2013 Ni ........................... C08L 67/00 174/120 SR
2013/0190432 A1 * 7/2013 Krause ..................... C08K 3/22 524/133
2016/0009901 A1 1/2016 Keestra et al.
2016/0340588 A1 11/2016 Bauer et al.
2019/0106568 A1 4/2019 Karayianni et al.
2019/0153197 A1 5/2019 Krause et al.
2020/0168362 A1 5/2020 Karayianni
2023/0212388 A1 7/2023 Karayianni
2023/0340255 A1 10/2023 Karayianni

FOREIGN PATENT DOCUMENTS

CN 110128816 A 8/2019
CN 110527237 A 12/2019
JP WO 2015/141708 A1 4/2017

OTHER PUBLICATIONS

International Search Report and Written Opinion for PCT/US2021/037381 dated Sep. 27, 2021, 10 pages.
Zhao et al., "Exploring the effect of melamine pyrophosphate and aluminum hypophosphite on flame retardant wood flour/polypropylene composites," *Construction and Building Materials 170*, 2018, pp. 193-199.

* cited by examiner

*Primary Examiner* — Marc S Zimmer
*Assistant Examiner* — Irginia L Stonehocker
(74) *Attorney, Agent, or Firm* — Dority & Manning, P.A.

(57) ABSTRACT

The invention provides a copolyetherester compositions that are resistant to burning and which show reduced smoke production when exposed to heat or flame.

18 Claims, No Drawings

POLYETHERESTER

CROSS-REFERENCE TO RELATED APPLICATIONS

This application claims priority under 35 U.S.C. § 365 to U.S. Provisional Application Nos. 63/039,098; 63/039,133; and 63/039,171, each of which was filed on Jun. 15, 2020, and each of which is incorporated herein by reference in its entirety.

FIELD OF INVENTION

The present invention relates to the field of copolyetheresters, particularly flame-retardant copolyetheresters.

BACKGROUND OF THE INVENTION

Several patents, patent applications and publications are cited in this description in order to more fully describe the state of the art to which this invention pertains. The entire disclosure of each of these patents, patent applications and publications is incorporated by reference herein.

Copolyetheresters are a group of elastomeric polyesters having hard segments comprising polyester blocks and soft segments comprising long-chain polyether diols. They are widely used in applications in which resilience and elasticity are required.

A typical copolyetherester is made by reacting one or more diacid moieties with a short-chain diol and a long-chain polyether diol.

Copolyetheresters show excellent elasticity, maintenance of mechanical properties at low temperature and good fatigue performance.

There is an ongoing need for non-halogen-containing fire resistant ("NHFR") copolyetheresters. Dialkyl phosphinate salts are well-known, non-halogenated flame retardant molecules. U.S. Pat. No. 7,420,007 [Clariant Produkte (Deutschland) GmbH] describes the use of dialkylphosphinic salts of the formula (I):

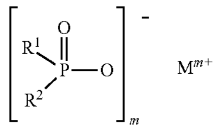

where $R^1$, $R^2$ are identical or different and are $C_1$-$C_6$-alkyl linear or branched;

M is Mg, Ca, Al, Sb, Sn, Ge, Ti, Fe, Zr, Zn, Ce, Bi, Sr, Mn, Li, Na, K and/or is a protonated nitrogen base; and m is from 1 to 4;

as flame-retardants in many different polymers, including polyetheresters.

U.S. Patent Appln. Publn. No. US2013/0190432 describes the use of aluminium diethyl phosphinate together with the aluminium salt of phosphorous acid as flame-retardant combination in nylon-6,6, nylon-6T/6,6, nylon-4,6, copolyetheresters and PBT.

While the use of flame retardants in polymer resins can significantly reduce flammability, it can unfortunately result in high smoke production upon exposure to heat or flame. This is of concern since smoke can be a significant contributor to damage and mortality in fires.

There is a need for resin and flame-retardant combinations that show not only reduced flammability but also reduced smoke production on exposure to heat and/or flames.

SUMMARY OF THE INVENTION

In a first aspect, the invention provides a flame-retardant polymer composition comprising:

(1) at least one polymer selected from copolyetherester, polyamide elastomer, thermoplastic polyolefinic elastomers, styrenic elastomer, thermoplastic polyurethane, thermoplastic vulcanisate;
(2) aluminium diethylphosphinate;
(3) zinc diethylphosphinate; and
(4) 2 to 20 wt % of phosphite, wherein the phosphite is selected from an aluminium salt of phosphorous acid, a zinc salt of phosphorous acid, and a mixture of these, wherein the wt %'s are based on the total weight of the composition.

In a second aspect, the invention provides a flame-retardant copolyetherester composition comprising:

(1) at least one copolyetherester;
(2) aluminium diethylphosphinate;
(3) zinc diethylphosphinate; and
(4) 2 to 20 wt % of phosphite, wherein the phosphite is selected from an aluminium salt of phosphorous acid, a zinc salt of phosphorous acid, and a mixture of these, wherein the wt %'s are based on the total weight of the composition.

In a third aspect, the invention provides a shaped article made from a flame-retardant copolyetherester composition comprising:

(1) at least one copolyetherester;
(2) aluminium diethyl phosphinate;
(3) zinc diethylphosphinate; and
(4) 2 to 20 wt % of phosphite, wherein the phosphite is selected from an aluminium salt of phosphorous acid, a zinc salt of phosphorous acid, and a mixture of these, wherein the wt %'s are based on the total weight of the composition.

In a fourth aspect, the invention provides a cable comprising a light or electrical conducting core and a sheath made from a flame-retardant copolyetherester composition comprising:

(1) at least one copolyetherester;
(2) aluminium diethyl phosphinate;
(3) zinc diethylphosphinate; and
(4) 2 to 20 wt % of phosphite, wherein the phosphite is selected from an aluminium salt of phosphorous acid, a zinc salt of phosphorous acid, and a mixture of these, wherein the wt %'s are based on the total weight of the composition.

In a fifth aspect, the invention provides a method for making a composition of the invention, comprising the step of:

melt-mixing the ingredients listed in an extruder.

DETAILED DESCRIPTION OF THE INVENTION

Definitions and Abbreviations

PBT poly(butylene terephthalate)

PTMEG polytetramethylene ether glycol

Copolyetherester or TPC thermoplastic elastomer arising from the reaction of at least one diol, at least one diacid and at least one poly(alkylenoxide)diol DEPAl aluminium diethyl phosphinate DEPZn zinc diethyl phosphinate Phosphite as used herein is synonymous with aluminium and/or zinc "salts of phosphorous acid" or "salts of phosphonic acid"

The inventors have surprisingly found that when a copolyetherester is formulated with DEPAl, DEPZn and from 2 to 16 wt % of a phosphite selected from an aluminium salt of phosphorous acid, a zinc salt of phosphorous acid, and a mixture of these, a composition having good flame-retardancy and reduced smoke production on exposure to heat and/or flame is obtained.

The inventors have also surprisingly found that the addition of a phosphite selected from an aluminium salt of phosphorous acid, a zinc salt of phosphorous acid, and a mixture of these to a flame-retardant copolyetherester composition containing DEPAl and DEPZn reduces the smoke produced by the composition when exposed to heat and/or flame.

DEPAl and DEPZn are well known to confer flame retardancy to polymer formulations. The inventors have now found that the addition of phosphite reduces smoke production. The addition of phosphite appears to slightly decrease the flame-retardancy conferred by the DEPAl and the DEPZn, hence the phosphite should be added in an amount that does not overly compromise the flame-retardancy while at the same time reducing smoke production. The inventors have found that the addition of phosphite in an amount of 2 to 16 wt %, based on the total weight of the composition, results in acceptable flame-retardance and reduced smoke production.

Copolyetheresters suitable for the compositions of the invention are polymers made by reacting a $C_2$-$C_6$ diol with an aromatic diacid moiety and a poly(alkyleneoxide)diol.

The poly(alkyleneoxide)diol is preferably selected from poly(ethyleneoxide)diol, poly(propyleneoxide)diol, poly(tetramethyleneoxide)diol ("PTMEG"), and mixtures of these. The poly(propyleneoxide)diol and poly(tetramethyleneoxide)diol may be straight-chain or branched. If they are branched at a carbon containing the terminal hydroxyl, they are preferably end-capped with ethylene glycol or poly(ethyleneoxide)diol. Particularly preferred, poly(propyleneoxide)diol and poly(tetramethyleneoxide)diol ("PTMEG"), and mixtures of these, with PTMEG being more particularly preferred.

The $C_2$-$C_6$ diol is preferably selected from ethylene glycol, propylene glycol, butylene glycol, and mixtures of these, with butylene glycol being more particularly preferred.

The aromatic diacid is preferably selected from terephthalate, iso-terephthalate, and mixtures of these, with terephthalate being particularly preferred.

Particularly preferred copolyetheresters are selected from:

1. Copolyetheresters made from butylene diol, terephthalate and PTMEG;
2. Copolyetheresters made from butylene diol, terephthalate and poly(propyleneoxide)diol;
3. Copolyetheresters made from propylene diol, terephthalate and PTMEG; and
4. Copolyetheresters made from propylene diol, terephthalate and poly(propyleneoxide)diol.

Particularly preferred is a copolyetherester made from butylene diol, terephthalate and PTMEG.

The softness of copolyetheresters is affected by the chain-length (i.e. molecular weight) of the poly(alkyleneoxide)diol and by the relative amount of poly(alkyleneoxide)diol that is used to make the polymer.

In a preferred embodiment, the poly(alkyleneoxide)diol has a molecular weight of at or about 2000 g/mol.

In another preferred embodiment, the poly(alkyleneoxide)diol constitutes from 40 wt % to 80 wt % of the copolyetherester based on the total weight of the copolyetherester, more preferably 50 to 75 wt %, particularly preferably 72.5 wt %.

In a particularly preferred embodiment, the copolyetherester comprises a poly(alkyleneoxide)diol having a molecular weight of at or about 2000 g/mol at 40 wt % to 80 wt % of the copolyetherester based on the total weight of the copolyetherester, more preferably 50 to 75 wt %, particularly preferably 72.5 wt %.

A particularly preferred copolyetherester comprises at or about 72.5 weight percent of polytetramethylene oxide, preferably having an average molecular weight of about 2000 g/mol, as polyether block segments, the weight percentage being based on the total weight of the copolyetherester elastomer, the short chain ester units of the copolyetherester being polybutylene terephthalate segments.

In addition to at least one copolyetherester, the compositions of the invention comprise aluminium diethyl phosphinate ("DEPAl") and zinc diethyl phosphinate ("DEPZn").

The total phosphinate concentration is preferably 5 to 50 wt %, more preferably 10 to 40 wt %, particularly preferably 10 to 25 wt %, based on the total weight of the copolyetherester composition.

Preferred combinations of phosphinates are:

5-20 wt % DEPAl and 5-20 wt % DEPZn;

8-15 wt % DEPAl and 8-15 wt % DEPZn;

10 wt % DEPAl and 10 wt % DEPZn;

8-15 wt % DEPAl and 2-6 wt % DEPZn;

15 wt % DEPAl and 5 wt % DEPZn;

15-25 wt % DEPAl and 15-25 wt % DEPZn;

20 wt % DEPAl and 20 wt % DEPZn;

wherein the wt %'s are based on the total weight of the composition.

Loadings of total phosphinate greater than 40 wt % result in compositions having poor mechanical properties. For some applications the mechanical properties at such high loadings may be adequate, however, in general it is preferred that the total phosphinate concentration not exceed 40 wt %.

In a preferred embodiment, the DEPAl has a D95 (volume %, measured using laser diffraction technology with a Malvern Mastersizer 2000 particle size analyser instrument, in acetone) of 10 microns.

Also in a preferred embodiment, the DEPZn has a D95 (volume %, measured using laser diffraction technology with a Malvern Mastersizer 2000 particle size analyser instrument, in acetone) of 10 microns.

In another preferred embodiment, the DEPAl and the DEPZn have a D95 (volume %, measured using laser diffraction technology with a Malvern Mastersizer 2000 particle size analyser instrument, in acetone) of ≤10 microns.

The compositions of the invention additionally comprise an aluminium salt of phosphorous acid, a zinc salt of phosphorous acid, or both, at 2 to 16 wt %, wherein the wt %'s are based on the total weight of the composition. Phosphorous acid is also referred to as phosphonic acid, $HP(=O)(OH)_2$.

Phosphorous acid has tautomeric forms as shown below:

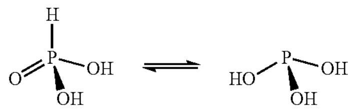

Aluminium salts of phosphorous acid are also referred to as aluminium phosphites.

Preferred aluminium phosphites are those having the CAS numbers [15099 32-8], [119103-85-4], [220689-59-8], [CAS 56287-23-1], [156024-71-4], [71449-76-8] and [15099-32-8]. Particularly preferred are aluminium phosphites of the type $Al_2(HPO_3)_3$*0.1-30 $Al_2O_3$*0-50 $H_2O$, more preferably of the type $Al_2(HPO_3)_3$*0.2-20 $Al_2O_3$*0-50 $H_2O$, most preferably of the type $Al_2(HPO_3)_3$*1-3 $Al_2O_3$*0-50 $H_2O$.

Particularly preferred are mixtures of aluminium phosphite and aluminium hydroxide having the composition of 5-95% by weight of $Al_2(HPO_3)_3$*$nH_2O$ and 95-5% by weight of $Al(OH)_3$, more preferably 10-90% by weight of $Al_2(HPO_3)$*$nH_2O$ and 90-10% by weight of $Al(OH)_3$, most preferably 35-65% by weight of $Al_2(HPO_3)_3$*$nH_2O$ and 65-35% by weight of $Al(OH)_3$ and in each case n=0 to 4.

Particularly preferred is the aluminium phosphite having the CAS number [CAS 56287-23-1].

In a preferred embodiment, the phosphite(s) have a D95 (volume %, measured using laser diffraction technology with a Malvern Mastersizer 2000 particle size analyser instrument, in acetone) of 10 microns.

In a preferred embodiment, the aluminium phosphite has a D95 (volume %, measured using laser diffraction technology with a Malvern Mastersizer 2000 particle size analyser instrument, in acetone) of 10 microns.

Particularly preferred is aluminium phosphite [56287-23-1] having a D95 (volume %, measured using laser diffraction technology with a Malvern Mastersizer 2000 particle size analyser instrument, in acetone) of 10 microns.

Zinc salts of phosphorous acid are referred to herein as zinc phosphites. Particularly preferred is zinc phosphite having CAS number [CAS 14332-59-3], depicted below.

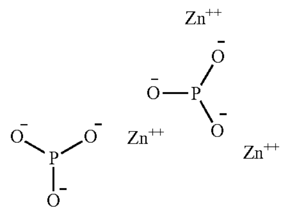

In a preferred embodiment, the zinc phosphite has a particle size of D95 (volume %, measured using laser diffraction technology with a Malvern Mastersizer 2000 particle size analyser instrument, in acetone) of 10 microns. Alternatively, the zinc phosphite preferably has particle sizes from 0.1 to 100 micron and particularly preferably from 0.1 to 30 micron.

Particularly preferred is zinc phosphite [14332-59-3] having a D95 (volume %, measured using laser diffraction technology with a Malvern Mastersizer 2000 particle size analyser instrument, in acetone) of 10 microns.

In preferred compositions of the invention, aluminium phosphite [CAS 56287-23-1] and zinc phosphite [CAS 14332-59-3] are used.

The total phosphite concentration is from 2 to 20 wt %, more preferably 10 wt % or less, based on the total weight of the copolyetherester composition. Although good smoke reduction is obtained with high phosphite loadings, above 10 wt % total phosphite, the flame-retardant characteristics of the composition may be compromised, making them unsuitable for certain applications. In a preferred embodiment, the total phosphite concentration is 5-10 wt %, based on the total weight of the composition.

The compositions of the invention may additionally comprise at least one nitrogen-containing synergist and/or a phosphorus-containing flame retardant and/or a nitrogen-containing flame retardant. More preferably, the compositions additionally comprise at least one melamine derivative, selected from melamine salts with organic or inorganic acids and mixtures of these. More particularly preferably, the compositions of the invention additionally comprise at least one component selected from salts of melamine with boric acid, cyanuric acid, phosphoric acid and/or pyro/polyphosphoric acid, and mixtures of these. Particularly preferred is melamine pyrophosphate.

Some preferred compositions of the invention are listed below. Weight percentages (wt %'s) are based on the total weight of the composition.

A preferred composition of the invention is a copolyetherester composition comprising:

(1) at least one copolyetherester;
(2) DEPAl;
(3) DEPZn;
(4) 2-16 wt % Al phosphite, particularly [CAS 56287-23-1].

Another preferred composition of the invention is a copolyetherester composition comprising:

(1) at least one copolyetherester;
(2) DEPAl;
(3) DEPZn;
(4) 2-10 wt % Al phosphite, particularly [CAS 56287-23-1].

Another preferred composition of the invention is a copolyetherester composition comprising:

(1) at least one copolyetherester;
(2) DEPAl;
(3) DEPZn;
(4) at least 5 wt % Al phosphite, particularly [CAS 56287-23-1].

Another preferred composition of the invention is a copolyetherester composition comprising:

(1) at least one copolyetherester;
(2) DEPAl
(3) DEPZn;
(4) 2 to 16 wt % Zn phosphite, particularly [CAS 14332-59-3].

Another preferred composition of the invention is a copolyetherester composition comprising:

(1) at least one copolyetherester;
(2) DEPAl
(3) DEPZn;
(4) 2 to 10 wt % Zn phosphite, particularly [CAS 14332-59-3].

Another preferred composition of the invention is a copolyetherester composition comprising:

(1) at least one copolyetherester;
(2) DEPAl;
(3) DEPZn;
(4) 2-8 wt % Al phosphite, particularly [CAS 56287-23-1], and 2-8 wt % Zn phosphite, particularly [CAS 14332-59-3].

Another preferred composition of the invention is a copolyetherester composition comprising:

(1) at least one copolyetherester;
(2) 8-12 wt %, in particular 10 wt % DEPAl;
(3) 8-12 wt %, in particular 10 wt % DEPZn;

(4) 2-8 wt % Al phosphite, particularly [CAS 56287-23-1], and 2-8 wt % Zn phosphite, particularly [CAS 14332-59-3].

Another preferred composition of the invention is a copolyetherester composition comprising:
(1) at least one copolyetherester;
(2) 12-16 wt %, in particular 15 wt % DEPAl;
(3) 2-6 wt %, in particular 5 wt % DEPZn;
(4) 2-8 wt %, in particular 5 wt % Al phosphite, particularly [CAS 56287-23-1].

Another preferred composition of the invention is a copolyetherester composition comprising:
(1) at least one copolyetherester;
(2) 12-16 wt %, in particular 15 wt % DEPAl;
(3) 2-6 wt %, in particular 5 wt % DEPZn;
(4) 2-8 wt %, in particular 5 wt % Zn phosphite, particularly [CAS 14332-59-3].

Another preferred composition of the invention is a copolyetherester composition comprising:
(1) at least one copolyetherester;
(2) 12-16 wt %, in particular 15 wt % DEPAl;
(3) 2-6 wt %, in particular 5 wt % DEPZn;
(4) 2-8 wt %, in particular 4 wt % Al phosphite, particularly [CAS 56287-23-1], and 2-8 wt %, in particular 4 wt % Zn phosphite, particularly [CAS 14332-59-3].

Another preferred composition of the invention is a copolyetherester composition comprising:
(1) at least one copolyetherester;
(2) 18-22 wt %, in particular 20 wt % DEPAl;
(3) 18-22 wt %, in particular 20 wt % DEPZn;
(4) 6-10 wt %, in particular 8 wt % Al phosphite, particularly [CAS 56287-23-1], and 6-10 wt %, in particular 8 wt % Zn phosphite, particularly [CAS 14332-59-3].

Another preferred composition of the invention is a copolyetherester composition comprising:
(1) at least one copolyetherester;
(2) 18-22 wt %, in particular 20 wt % DEPAl;
(3) 18-22 wt %, in particular 20 wt % DEPZn;
(4) 6-10 wt %, in particular 8 wt % Al phosphite, particularly [CAS 56287-23-1].

Another preferred composition of the invention is a copolyetherester composition comprising:
(1) at least one copolyetherester;
(2) 18-22 wt %, in particular 20 wt % DEPAl;
(3) 18-22 wt %, in particular 20 wt % DEPZn;
(4) 6-10 wt %, in particular 8 wt % Zn phosphite, particularly [CAS 14332-59-3].

A preferred composition of the invention is a copolyetherester composition comprising:
(1) at least one copolyetherester;
(2) DEPAl;
(3) DEPZn;
(4) 2-16 wt % Al phosphite [CAS 56287-23-1].

Another preferred composition of the invention is a copolyetherester composition comprising:
(1) at least one copolyetherester;
(2) DEPAl;
(3) DEPZn;
(4) 2-10 wt % Al phosphite [CAS 56287-23-1].

Another preferred composition of the invention is a copolyetherester composition comprising:
(1) at least one copolyetherester;
(2) DEPAl;
(3) DEPZn;
(4) at least 5 wt % Al phosphite [CAS 56287-23-1].

Another preferred composition of the invention is a copolyetherester composition comprising:
(1) at least one copolyetherester;
(2) DEPAl
(3) DEPZn;
(4) 2 to 16 wt % Zn phosphite [CAS 14332-59-3].

Another preferred composition of the invention is a copolyetherester composition comprising:
(1) at least one copolyetherester;
(2) DEPAl
(3) DEPZn;
(4) 2 to 10 wt % Zn phosphite [CAS 14332-59-3].

Another preferred composition of the invention is a copolyetherester composition comprising:
(1) at least one copolyetherester;
(2) DEPAl;
(3) DEPZn;
(4) 2-8 wt % Al phosphite [CAS 56287-23-1], and 2-8 wt % Zn phosphite [CAS 14332-59-3].

Another preferred composition of the invention is a copolyetherester composition comprising:
(1) at least one copolyetherester;
(2) 8-12 wt %, in particular 10 wt % DEPAl;
(3) 8-12 wt %, in particular 10 wt % DEPZn;
(4) 2-8 wt % Al phosphite [CAS 56287-23-1], and 2-8 wt % Zn phosphite [CAS 14332-59-3].

Another preferred composition of the invention is a copolyetherester composition comprising:
(1) at least one copolyetherester;
(2) 12-16 wt %, in particular 15 wt % DEPAl;
(3) 2-6 wt %, in particular 5 wt % DEPZn;
(4) 2-8 wt %, in particular 5 wt % Al phosphite [CAS 56287-23-1].

Another preferred composition of the invention is a copolyetherester composition comprising:
(1) at least one copolyetherester;
(2) 12-16 wt %, in particular 15 wt % DEPAl;
(3) 2-6 wt %, in particular 5 wt % DEPZn;
(4) 2-8 wt %, in particular 5 wt % Zn phosphite [CAS 14332-59-3].

Another preferred composition of the invention is a copolyetherester composition comprising:
(1) at least one copolyetherester;
(2) 12-16 wt %, in particular 15 wt % DEPAl;
(3) 2-6 wt %, in particular 5 wt % DEPZn;
(4) 2-8 wt %, in particular 4 wt % Al phosphite [CAS 56287-23-1], and 2-8 wt %, in particular 4 wt % Zn phosphite [CAS 14332-59-3].

Another preferred composition of the invention is a copolyetherester composition comprising:
(1) at least one copolyetherester;
(2) 18-22 wt %, in particular 20 wt % DEPAl;
(3) 18-22 wt %, in particular 20 wt % DEPZn;
(4) 6-10 wt %, in particular 8 wt % Al phosphite [CAS 56287-23-1], and 6-10 wt %, in particular 8 wt % Zn phosphite [CAS 14332-59-3].

Another preferred composition of the invention is a copolyetherester composition comprising:
(1) at least one copolyetherester;
(2) 18-22 wt %, in particular 20 wt % DEPAl;
(3) 18-22 wt %, in particular 20 wt % DEPZn;
(4) 6-10 wt %, in particular 8 wt % Al phosphite [CAS 56287-23-1].

Another preferred composition of the invention is a copolyetherester composition comprising:
(1) at least one copolyetherester;
(2) 18-22 wt %, in particular 20 wt % DEPAl;

(3) 18-22 wt %, in particular 20 wt % DEPZn;
(4) 6-10 wt %, in particular 8 wt % Zn phosphite [CAS 14332-59-3].

Another preferred composition of the invention is a copolyetherester composition comprising:
(1) at least one copolyetherester;
(2) 10 wt % DEPAl;
(3) 10 wt % DEPZn;
(4) 2-8 wt % Al phosphite [CAS 56287-23-1], and 2-8 wt % Zn phosphite [CAS 14332-59-3].

Another preferred composition of the invention is a copolyetherester composition comprising:
(1) at least one copolyetherester;
(2) 15 wt % DEPAl;
(3) 5 wt % DEPZn;
(4) 5 wt % Al phosphite [CAS 56287-23-1].

Another preferred composition of the invention is a copolyetherester composition comprising:
(1) at least one copolyetherester;
(2) 15 wt % DEPAl;
(3) 5 wt % DEPZn;
(4) 5 wt % Zn phosphite [CAS 14332-59-3].

Another preferred composition of the invention is a copolyetherester composition comprising:
(1) at least one copolyetherester;
(2) 15 wt % DEPAl;
(3) 5 wt % DEPZn;
(4) 4 wt % Al phosphite [CAS 56287-23-1], and 4 wt % Zn phosphite [CAS 14332-59-3].

Another preferred composition of the invention is a copolyetherester composition comprising:
(1) at least one copolyetherester;
(2) 20 wt % DEPAl;
(3) 20 wt % DEPZn;
(4) 8 wt % Al phosphite [CAS 56287-23-1], and 8 wt % Zn phosphite [CAS 14332-59-3].

Another preferred composition of the invention is a copolyetherester composition comprising:
(1) at least one copolyetherester;
(2) 20 wt % DEPAl;
(3) 20 wt % DEPZn;
(4) 8 wt % Al phosphite [CAS 56287-23-1].

Another preferred composition of the invention is a copolyetherester composition comprising:
(1) at least one copolyetherester;
(2) 20 wt % DEPAl;
(3) 20 wt % DEPZn;
(4) 8 wt % Zn phosphite [CAS 14332-59-3].

Another preferred composition of the invention is a copolyetherester composition comprising:
(1) at least one copolyetherester;
(2) 5-20 wt % DEPAl;
(3) 5-20 wt % DEPZn;
(4) 2-10 wt % of phosphite, wherein the phosphite is selected from Al phosphite [CAS 56287-23-1], Zn phosphite [CAS 14332-59-3], and mixtures of these.

Some particularly preferred compositions comprise the ingredients listed above, or consist of the ingredients listed above, plus one or more optional additives, such as antioxidants, heat-stabilizers, UV-stabilizers, mineral fillers, glass fibers, colorants, lubricants, plasticizers, impact-modifiers, etc. When present, each optional additive is present in an amount of from 0.01 to 5 wt %, and the total amount of all optional additives in the composition is 0.01 to 10 wt %, based on the total weight of the composition.

The compositions of the invention show good flammability performance. Flammability can be assessed by methods known to one skilled in the art. One method is Limiting Oxygen Index ("LOI") according to test method ISO 4589-1/-2, using test bars in the shape of rectangular bars of dimension 125 mm long by 13 mm wide and having an average thickness of about 1.7±0.1 mm. Preferably the compositions of the invention show an LOI of 20 or greater, more preferably 21 or greater, more particularly preferably 23 or greater when measured according to test method ISO 4589-1/-2, using test bars in the shape of rectangular bars of dimension 125 mm long by 13 mm wide and having an average thickness of about 1.7±0.1 mm.

Another parameter that can be used to evaluate flammability performance is the ratio of LOI of a composition containing DEPAL+DEPZn+phosphite ($LOI_{ex}$) to the LOI of the same composition without the phosphites ($LOI_0$). Preferably the compositions of the invention show a ratio of LOI of the composition incorporating the DEPAl+DEPZn and metal phosphite(s) to LOI of the composition without the metal phosphite(s) of about 0.75 or greater, more preferably 0.9 or greater, more particularly preferably 1.0 or greater when measured according to test method ISO 4589-1/-2, using test bars in the shape of rectangular bars of dimension 125 mm long by 13 mm wide and having an average thickness of about 1.7±0.1 mm.

The compositions of the invention achieve a good combination of good flammability performance and reduced smoke production.

Smoke density testing can be performed according to ISO 5659 test standard inside a NBS smoke chamber. Test specimens are prepared as plaques having an area of 75 mm×75 mm and thickness of 2 mm. The specimens are mounted horizontally within the chamber and exposed to a constant thermal irradiance on their upper surface of 25 $kW/m^2$ via a radiator cone and heat flux meter and in the presence of a pilot flame for a period of about 40 min. The smoke evolved over time is collected in the chamber, and the attenuation of a light beam passing through the smoke is measured with a photometric system including a 6.5 V incandescent lamp, a photomultiplier tube, and a high accuracy photodetector. The results are measured in terms of light transmission over time and reported in terms of specific optical density, $D_s$. $D_s$ is inversely proportional to light transmission and is given for a specific path length equal to the thickness of the molded specimen. Smoke production is measured as max specific optical density, $D_{s,max}$ and the total smoke production during the first 4 min of the test, VOF4. VOF4 is calculated as: $D_{s1min}+D_{s2min}+D_{s3min}+(D_{s4min}/2)$, where $D_{s1min}$, $D_{s2min}$, $D_{s3min}$, and $D_{s4min}$ are the values of the specific optical density recorder at the 1st, 2nd, 3rd and 4th minutes respectively. Any dripping from the plaque test specimen occurring during the test is recorded. The weight of the dripped material is subtracted from the weight of the 75 mm×75 mm×2 mm test plaque. This difference is reported in grams as the "mass retained" during experiment time. A normalised $D_{s,max}$ can be calculated by dividing $D_{s,max}$ over the mass retained during the experiment time, and is reported as $D_{s,\ max,\ ret}$.

Low values of $D_{s,max}$/mass retained in g and VOF4 are desirable and indicative of material that will reduce visibility less in the event of fire, thus allowing rapid escape of people from confined spaces. Without any smoke light transmittance is 100% and $D_s$ is 0.

The parameters VOF4 and [$D_{s,max}$/mass retained in g] can be used to evaluate smoke performance.

The compositions of the invention preferably show a VOF4 measured according to ISO 5659 test standard and using plaques having an area of 75 mm×75 mm and thickness of 2 mm, of not greater than 1000, more preferably not greater than 800, more particularly not greater than 750.

The compositions of the invention preferably show a $D_{s,max}$/mass retained in g measured according to ISO 5659 test standard and using plaques having an area of 75 mm×75 mm and thickness of 2 mm, of not greater than 40, more preferably not greater than 35, more particularly not greater than 30.

Another parameter that can be used to evaluate smoke performance is the ratio of $D_{s,max}$, ret of the composition including the DEPAl+DEPZn and metal phosphite(s) ($D_{s,max,\ ret\ ex}$) to $D_{s,max,\ ret}$ of the composition without metal phosphite(s) ($D_{s,max,\ ret\ 0}$). The compositions of the invention preferably show a ratio of $D_{s,max,\ ret}$ of the composition including the DEPAl+DEPZn and metal phosphite(s) to $D_{s,max,\ ret}$ of the composition without metal phosphite(s) measured according to ISO 5659 test standard and using plaques having an area of 75 mm×75 mm and thickness of 2 mm, of not greater than 0.81, more preferably not greater than 0.76, more particularly not greater than 0.6 or 0.5.

In a more particularly preferred embodiment, the compositions of the invention have an LOI of 20 or greater, more preferably 21 or greater, more particularly preferably 23 or greater when measured according to test method ISO 4589-1/-2, using test bars in the shape of rectangular bars of dimension 125 mm long by 13 mm wide and having an average thickness of about 1.7±0.1 mm, and a $D_{s,max}$/mass retained in g measured according to ISO 5659 test standard and using plaques having an area of 75 mm×75 mm and thickness of 2 mm, of not greater than 40, more preferably not greater than 35, more particularly not greater than 30.

The invention is further illustrated by certain embodiments in the examples below which provide greater detail for the compositions, uses and processes described herein. These examples, which set forth a preferred mode presently contemplated for carrying out the invention, are intended to illustrate and not to limit the invention.

Examples

Materials

The following materials were used to prepare the flame retardant polymer compositions described herein and the compositions of the comparative examples.

Copolyetherester (TPC): a copolyetherester elastomer comprising about 72.5 weight percent of polytetramethylene oxide having an average molecular weight of about 2000 g/mol as polyether block segments, the weight percentage being based on the total weight of the copolyetherester elastomer, the short chain ester units of the copolyetherester being polybutylene terephthalate segments. The copolyetherester elastomer contained up to 6 weight percent of heat stabilizers, antioxidants and metal deactivators, based on the total weight of the elastomer and the additives.

DEPAl: Aluminium diethylphosphinate having a D90 max (volume %, measured using laser diffraction technology with a Malvern Mastersizer 2000 particle size analyser instrument, in acetone) of 7.506 microns.

DEPZn: Zinc diethyl phosphinate.

Al Phosphite: Phosphorous acid, Aluminium salt [CAS 56287-23-1].

Zn Phosphite: Phosphorous acid, Zinc salt [CAS 14332-59-3].

Test Methods

Mechanical Properties

Mechanical tensile stress-strain performance was measured according to ISO 527 test method at room temperature. Test specimens were prepared from the compositions of the tables by melt-extruding narrow flat strips in a standard extruder having barrel temperatures set at about 170° C. to about 190° C. and cutting test specimens, in the shape of ISO 527 5A tensile bars and having an average thickness of about 1.7±0.1 mm, from the thus-obtained flat strips. Test specimens were conditioned for at least 24 hours at room temperature before testing. The tensile stress and elongation were measured at a speed of 200 mm/min. E-modulus was measured from the same specimen at a speed of 1 mm/min in the low strain region.

Flame Retardance

Flammability testing was performed according to Limiting Oxygen Index ("LOI") Test method ISO 4589-1/-2. Test specimens were prepared from the compositions of the tables by melt-extruding narrow flat strips in a standard extruder having barrel temperatures set at about 170° C. to about 190° C. and cutting test specimens, in the shape of rectangular bars of dimension 125 mm long by 13 mm wide and having an average thickness of about 1.7±0.1 mm, from the thus-obtained flat strips. Test specimens were conditioned for at least 72 hours at room temperature and 50% relative humidity before testing. According to this test, the specimen is clamped vertically at the centre of a glass chimney at room temperature in an atmosphere of a mixture of oxygen and nitrogen slowly fed into the glass column upwards, where the relative concentration of oxygen and nitrogen can be changed. The upper end of the test sample is ignited with a pilot flame and burns downward. The burning behaviour of the specimen is observed to compare the period for which burning continues. LOI is the minimum concentration of oxygen, expressed as a volume percentage, required to sustain the combustion of the sample indicated by a target burning time after ignition of less than 180 sec. High values of LOI are desirable and indicative of less easily ignited and less flammable material. Flammability was measured for all compositions after they had been preconditioned for at least 88 hours at 23° C. and 50 percent relative humidity immediately prior to use.

Smoke Density

Smoke density testing was performed according to ISO 5659 test standard inside a NBS smoke chamber, supplied by Fire Testing Technologies. Test specimens were prepared from the compositions of the tables by melt-extruding narrow flat strips in a standard extruder having barrel temperatures set at about 170° C. to about 190° C. and compression molding the strips to form plaques having an area of 75 mm×75 mm and thickness of 2 mm. The specimens were mounted horizontally within the chamber and exposed to a constant thermal irradiance on their upper surface of 25 $kW/m^2$ via a radiator cone and heat flux meter and in the presence of a pilot flame for a period of about 40 min. The smoke evolved over time is collected in the chamber, and the attenuation of a light beam passing through the smoke is measured with a photometric system including a 6.5 V incandescent lamp, a photomultiplier tube, and a high accuracy photodetector. The results are measured in terms of light transmission over time and reported in terms of specific optical density, $D_s$. $D_s$ is inversely proportional to light transmission and is given for a specific path length equal to the thickness of the molded specimen. Comparison between the material compositions is made via the measurement of max specific optical density, $D_{s,max}$ and the total smoke production during the first 4 min of the test, VOF4.

VOF4 is calculated as: $D_{s1min}+D_{s2min}+D_{s3min}+(D_{s4min}/2)$, where $D_{s1min}$, $D_{s2min}$, $D_{s3min}$, and $D_{s4min}$ are the values of the specific optical density recorder at the 1$^{st}$, 2$^{nd}$, 3$^{rd}$ and 4$^{th}$ minutes respectively. $D_{s,max}$ and VOF4 values are calculated automatically by the software of the NBS smoke chamber. Low values of $D_{s,max}$ and VOF4 are desirable and indicative of material that will less distract visibility in the event of fire, thus allowing rapid escape of people from confined spaces. Without any smoke, light transmittance is 100% and $D_s$ is 0.

Any dripping from the plaque test specimen occurring during the test is recorded. The weight of the dripped material is subtracted from the weight of the 75 mm×75 mm×2 mm test plaque. This difference is reported in grams as the "mass retained" during experiment time. A normalised $D_{s,max}$ can be calculated by dividing $D_{s,max}$ over the mass retained during the experiment time, and is reported as $D_{s,\ max,\ ret}$.

Experimental Data

Compositions designated with "CE" are comparative, and compositions designated with "E" are inventive.

Table 1

Table 1 shows flammability performance (LOI), and smoke production ($D_{s,max}$, VOF4 and $D_{s,max}$/mass retained in grams) for a comparative composition and compositions of the invention having 10 wt % DEPAl and 10 wt % DEPZn, based on the total weight of the composition. Comparative composition CE15 contains DEPAl and DEPZn and no phosphite. Flammability performance is good (LOI=26), however smoke production is high ($D_{s,max}$/mass retained in grams=48). Addition of Al phosphite at 2.5 and 5 wt % results in compositions (E20 and E13) having reasonable flammability performance (LOI's of 23 and 28, respectively), and substantially reduced smoke production ($D_{s,max}$/mass retained in grams of 22 and 38, respectively). Compositions E15 and E17 also retain passable flammability performance (LOI's of 24 and 23, respectively), and show substantially reduced smoke production ($D_{s,max}$/mass retained in grams of 26 and 17, respectively). As total phosphite is further increased in compositions E21 and E22, flammability performance drops (LOI's of 20 for both compositions), but smoke production is substantially reduced ($D_{s,max}$/mass retained in grams of 17 and 26, respectively).

Table 2

Table 2 shows flammability performance (LOI), and smoke production ($D_{s,max}$, VOF4 and $D_{s,max}$/mass retained in grams) for a comparative composition and compositions of the invention having 15 wt % DEPAl and 5 wt % DEPZn, based on the total weight of the composition. Comparative composition CE16 contains DEPAl and DEPZn and no phosphite. Flammability performance is good (LOI=28), however smoke production is high ($D_{s,max}$/mass retained in grams=59). Addition of Al phosphite at 5 wt % results in a composition (E23) having reasonable flammability performance (LOI of 25), and substantially reduced smoke production ($D_{s,max}$/mass retained in grams of 26). Compositions E24 and E25 show improved (E25) or retain good flammability performance (LOI's of 30 and 25, respectively), and show substantially reduced smoke production ($D_{s,max}$/mass retained in grams of 27 and 22, respectively).

Table 3

Table 3 shows flammability performance (LOI), and smoke production ($D_{s,max}$, VOF4 and $D_{s,max}$/mass retained in grams) for a comparative composition and compositions of the invention having 20 wt % DEPAl and 20 wt % DEPZn, based on the total weight of the composition. Comparative composition CE17 contains DEPAl and DEPZn and no phosphite. Flammability performance is good (LOI=32), however smoke production is high ($D_{s,max}$/mass retained in grams=43). Addition of Al phosphite at 8 wt % results in a composition (E14) having reasonable flammability performance (LOI of 27), and substantially reduced smoke production ($D_{s,max}$/mass retained in grams of 32). Composition E16 contains 8 wt % Zn phosphite, and retains good flammability performance (LOI of 27) and substantially reduced smoke production ($D_{s,max}$/mass retained in grams of 18).

While certain of the preferred embodiments of this invention have been described and specifically exemplified above, it is not intended that the invention be limited to such embodiments. Various modifications may be made without departing from the scope and spirit of the invention, as set forth in the following claims.

TABLE 1

| | CE15 [wt%] | E20 [wt%] | E13 [wt%] | E26 [wt%] | E27 [wt%] | E15 [wt%] | E28 [wt%] | E17 [wt%] | E21 [wt%] | E22 [wt%] |
|---|---|---|---|---|---|---|---|---|---|---|
| DEPAl/DEPZn/ Al Phosphite/ Zn Phosphite | | | | | | | | | | |
| TPC | 80.0 | 77.5 | 75 | 72 | 77.5 | 75 | 72 | 72 | 68 | 68 |
| DEPAl | 10 | 10 | 10 | 10 | 10 | 10 | 10 | 10 | 10 | 10 |
| DEPZn | 10 | 10 | 10 | 10 | 10 | 10 | 10 | 10 | 10 | 10 |
| Al Phosphite | — | 2.5 | 5 | 8 | — | — | — | 4 | 4 | 8 |
| Zn Phosphite | — | — | — | — | 2.5 | 5 | 8 | 4 | 8 | 4 |
| Total (%) of all ingredients | 100 | 100 | 100 | 100 | 100 | 100 | 100 | 100 | 100 | 100 |
| Limited Oxygen Index | | | | | | | | | | |
| LOI (%) | 26 | 23 | 28 | 27 | 26 | 24 | 22 | 23 | 20 | 20 |
| $LOI_{ex}/LOI_0$ | — | 0.88 | 1.08 | 1.04 | 1.0 | 0.92 | 0.85 | 0.88 | 0.77 | 0.77 |
| Smoke Density | | | | | | | | | | |
| $D_{s,\ max}$ | 595 | 258 | 419 | 283 | 467 | 300 | 301 | 202 | 198 | 310 |
| VOF4 | 1360 | 481 | 988 | 464 | 1044 | 667 | 687 | 461 | 488 | 624 |
| $D_{s,max}$/mass retained in g | 48 | 22 | 38 | 25 | 39 | 26 | 25.5 | 17 | 17 | 26 |
| $D_{s,max,ret,ex}/D_{s,max,ret,0}$ | — | 0.46 | 0.79 | 0.52 | 0.81 | 0.54 | 0.53 | 0.35 | 0.35 | 0.54 |

TABLE 2

| | CE16 [wt %] | E23 [wt %] | E24 [wt %] | E29 [wt %] | E25 [wt %] |
|---|---|---|---|---|---|
| DEPAl/DEPZn/ Al Phosphite/ Zn Phosphite | | | | | |
| TPC | 80 | 75 | 75 | 75 | 72 |
| DEPAl | 15 | 15 | 15 | 15 | 15 |
| DEPZn | 5 | 5 | 5 | 5 | 5 |
| Al Phosphite | — | 5 | — | — | 4 |
| Zn Phosphite | — | — | 5 | 8 | 4 |
| Total (%) of all ingredients | 100 | 100 | 100 | 100 | 100 |
| Limited Oxygen Index | | | | | |
| LOI (%) | 28 | 25 | 30 | 35 | 25 |
| $LOI_{ex}/LOI_0$ | — | 0.89 | 1.07 | 1.25 | 0.89 |
| Smoke Density | | | | | |
| $D_{s,max}$ | 782 | 318 | 303 | 540 | 267 |
| VOF4 | 1617 | 662 | 654 | 1230 | 556 |
| $D_{s,max}$/mass retained in g | 59 | 26 | 27 | 45 | 22 |
| $D_{s,max,ret,ex}/D_{s,max,ret,0}$ | — | 0.44 | 0.46 | 0.76 | 0.37 |

TABLE 3

| | CE17 [wt %] | E14 [wt %] | E16 [wt %] | E18 [wt %] |
|---|---|---|---|---|
| DEPAl/DEPZn/ Al Phosphite/ Zn Phosphite | | | | |
| TPC | 60 | 52 | 52 | 54 |
| DEPAl | 20 | 20 | 20 | 10 |
| DEPZn | 20 | 20 | 20 | 20 |
| Al Phosphite | — | 8 | — | 8 |
| Zn Phosphite | — | — | 8 | 8 |
| Total (%) of all ingredients | 100 | 100 | 100 | 100 |
| Limited Oxygen Index | | | | |
| LOI (%) | 32 | 27 | 27 | 22 |
| $LOI_{ex}/LOI_0$ | — | 0.84 | 0.84 | 0.69 |
| Smoke Density | | | | |
| $D_{s,max}$ | 507 | 382 | 219 | 152 |
| VOF4 | 1203 | 729 | 449 | 326 |
| $D_{s,max}$/mass retained in g | 43 | 32 | 18 | 13 |
| $D_{s,max,ret,ex}/D_{s,max,ret,0}$ | — | 0.74 | 0.35 | 0.30 |

The invention claimed is:

1. A flame-retardant polymer composition comprising:
(1) at least one polymer comprising copolyetherester;
(2) aluminium diethylphosphinate;
(3) zinc diethylphosphinate; and
(4) 2 to 20 wt % of phosphite, wherein the phosphite is selected from an aluminium salt of phosphorous acid, a zinc salt of phosphorous acid, and a mixture of these,
wherein the weight percentages are based on the total weight of the composition, wherein the composition has an LOI of 20 or greater when measured according to test method ISO 4589-1/-2, using test bars in the shape of rectangular bars of dimension 125 mm long by 13 mm wide and having an average thickness of about 1.7±0.1 mm.

2. The composition of claim 1, wherein the copolyetherester is made by reacting a $C_2$-$C_6$ diol with an aromatic diacid moiety and a poly(alkyleneoxide)diol.

3. The composition of claim 1, wherein the copolyetherester is made using a poly(alkyleneoxide)diol selected from poly(ethyleneoxide)diol, poly(propyleneoxide)diol, poly(tetramethyleneoxide)diol and mixtures of two or more of these.

4. The composition of claim 1, wherein the copolyetherester is made using a $C_2$-$C_6$ diol selected from ethylene glycol, propylene glycol, butylene glycol, and mixtures of two or more of these.

5. The composition of claim 1, wherein the copolyetherester is made using an aromatic diacid selected from terephthalate, iso-terephthalate, and mixtures of these.

6. The composition of claim 1, wherein the total of aluminium diethylphosphinate and zinc diethylphosphinate is 5 to 40 wt % based on the total weight of the composition.

7. The composition of claim 1, comprising Al phosphite, Zn phosphite, or a mixture of these.

8. The composition of claim 1, comprising:
(1) at least one copolyetherester;
(2) 5 to 20 wt % aluminium diethylphosphinate;
(3) 5 to 20 wt % zinc diethylphosphinate;
(4) 2 to 10 wt % of phosphite, wherein the phosphite is selected from Al phosphite, Zn phosphite, and mixtures of these.

9. The composition of claim 1, wherein the ratio of LOI of the composition to LOI of the composition without the metal phosphite(s) is 0.75 or greater when measured according to test method ISO 4589-1/-2, using test bars in the shape of rectangular bars of dimension 125 mm long by 13 mm wide and having an average thickness of about 1.7±0.1 mm.

10. The composition of claim 1, having a $D_{s,max}$/mass retained in g measured according to ISO 5659 test standard and using plaques having an area of 75 mm×75 mm and thickness of 2 mm, of not greater than 40.

11. The composition of claim 1, wherein the ratio of $D_{s,max}$, ret of the composition to $D_{s,max}$, ret of the composition without metal phosphite(s) measured according to ISO 5659 test standard and using plaques having an area of 75 mm×75 mm and thickness of 2 mm, is not greater than 0.81.

12. The composition of claim 1, additionally comprising (2') 0.2 to 16 wt % of aluminum salts of ethylbutylphosphinic acid, dibutylphosphinic acid, ethylhexylphosphinic acid, butylhexylphosphinic acid, dihexylphosphinic acid, or mixtures of two or more of these.

13. The composition of claim 1, wherein the aluminium diethylphosphinate, the zinc diethylphosphinate, the phosphite(s), or a combination thereof has a D95 (volume %, measured using laser diffraction technology with a Malvern Mastersizer 2000 particle size analyser instrument, in acetone) of ≤10 microns.

14. The composition of claim 1, comprising zinc phosphite having particle sizes from 0.1 to 100 micron.

15. The composition of claim 1, additionally comprising at least one nitrogen-containing synergist and/or a phosphorus-containing flame retardant and/or a nitrogen-containing flame retardant.

16. The composition of claim 1, comprising melamine pyrophosphate.

17. A shaped article made from the composition of claim 1.

18. A cable comprising a light or electrical conducting core and a sheath made from a flame-retardant composition according to claim 1.

* * * * *